C. VON ALLMEN.
WHEEL.
APPLICATION FILED AUG. 23, 1916.

1,254,178.

Patented Jan. 22, 1918.

INVENTOR.
Christian Von Allmen.
BY
W. B. Munnell
ATTORNEY

UNITED STATES PATENT OFFICE.

CHRISTIAN VON ALLMEN, OF LOUISVILLE, KENTUCKY.

WHEEL.

1,254,178.  Specification of Letters Patent.  Patented Jan. 22, 1918.

Application filed August 23, 1916.  Serial No. 116,530.

*To all whom it may concern:*

Be it known that I, CHRISTIAN VON ALLMEN, a citizen of the United States, residing at Louisville, in the county of Jefferson and State of Kentucky, have invented a new and useful Improvement in Wheels, of which the following is a specification.

This invention relates to wheels for vehicles of the character known as steering wheels, in which the wheel is connected with the axle of the vehicle by means of a vertical pivot.

An object of this invention is to provide a construction in which the connection between the axle and the wheel will lie within the plane of the wheel and preferably in the central plane thereof.

Another object is to provide a construction of wheel, which will offer greater facilities in the matter of steering than now in general use.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claim.

Figure 2:
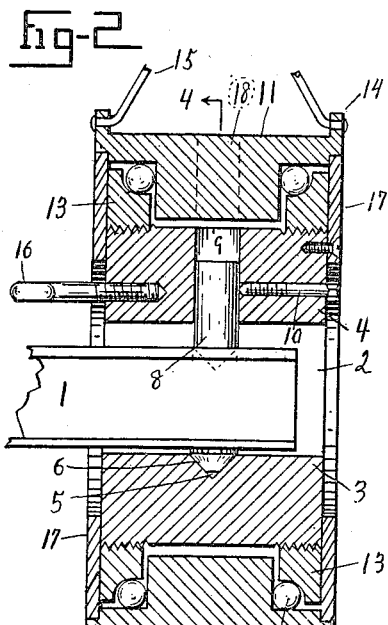
Figure 1:
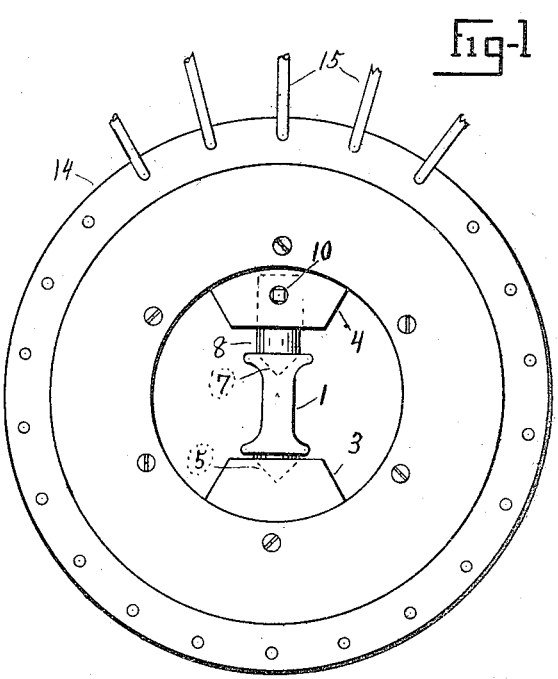
Figure 3:
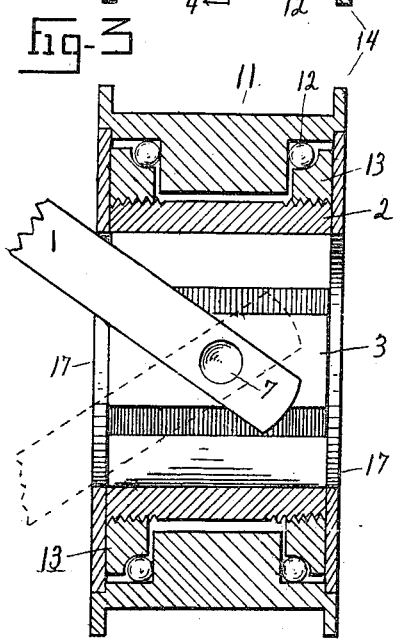
Figure 4:
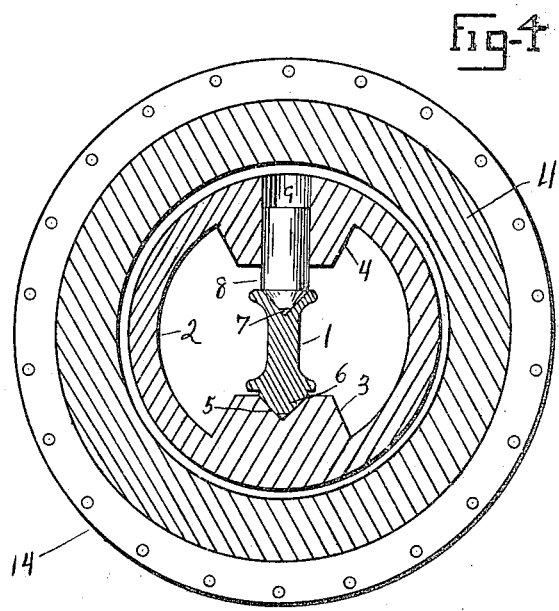

Referring now to the drawing wherein similar reference characters designate like parts in the several views, Figure 1 is a side elevation of a portion of a wheel embodying my invention: Fig. 2, a central vertical transverse section on Fig. 1: Fig. 3, a central horizontal transverse section on Fig. 1, showing the range of movement of the wheels relative to the axle: Fig. 4, a vertical section on line 4—4 of Fig. 2.

Referring now in detail to the drawing the reference character —1— designates a vehicle axle which may be of any usual or desired pattern. The axle is pivotally supported by suitable means within an annular ring —2—. The ring 2 is provided interiorly with vertically alined abutments —3 and 4— between which the axle is positioned. The lower abutment 3 is provided with a tapered bearing —5— adapted to receive a conical projection —6— which depends from the lower surface of the axle. The axle is provided on its upper surface with a tapered bearing —7— which is in alinement with the projection 6 and is adapted to receive a pin —8— which is slidably mounted in a passage —9— which extends through the upper abutment 4. The pin 8 may be secured in adjusted position by means of a set screw —10—. The distance between the faces of the abutments 3 and 4 is equal to the distance through the axle and the conical projection 7, so that by raising the axle until the projection clears the bearing the wheel may be removed from the axle. An annular ring, or hub —11— is rotatably disposed about the ring 2, suitable antifriction means, such as balls —12— being interposed between the two rings. Adjustable cone bearings —13— which are in screw threaded connection with the ring 2, serve to take up any wear in the bearings. Suitable means such as peripheral flanges —14— are provided for the attachment of spokes —15—. Suitable means such as a bolt —16—, is provided whereto connection may be made for the purpose of exerting stress upon the wheel to change its angular relation to the axle. An annular plate —17— is attached to each side in position to cover the space between the ring 2 and the hub 11. By loosening the set screw the pin may be raised and then the axle can be raised and the wheel removed.

Having thus described my invention so that anyone may make and use the same, I claim:

An annulus, oppositely disposed abutments on the interior thereof, one of said abutments having a bearing on its face, the other abutment having a radial perforation in alinement with said bearing, an axle having a pivot extended from one side adapted to fit in said bearing and a recess on the opposite side in alinement with said pivot and a pin fitted in said perforation and adapted to enter said recess.

C. VON ALLMEN.